July 28, 1925.
J. LA RIBOISIERE
1,548,016
COMBINED CLUTCH AND TRANSMISSION MECHANISM
Filed June 21, 1924
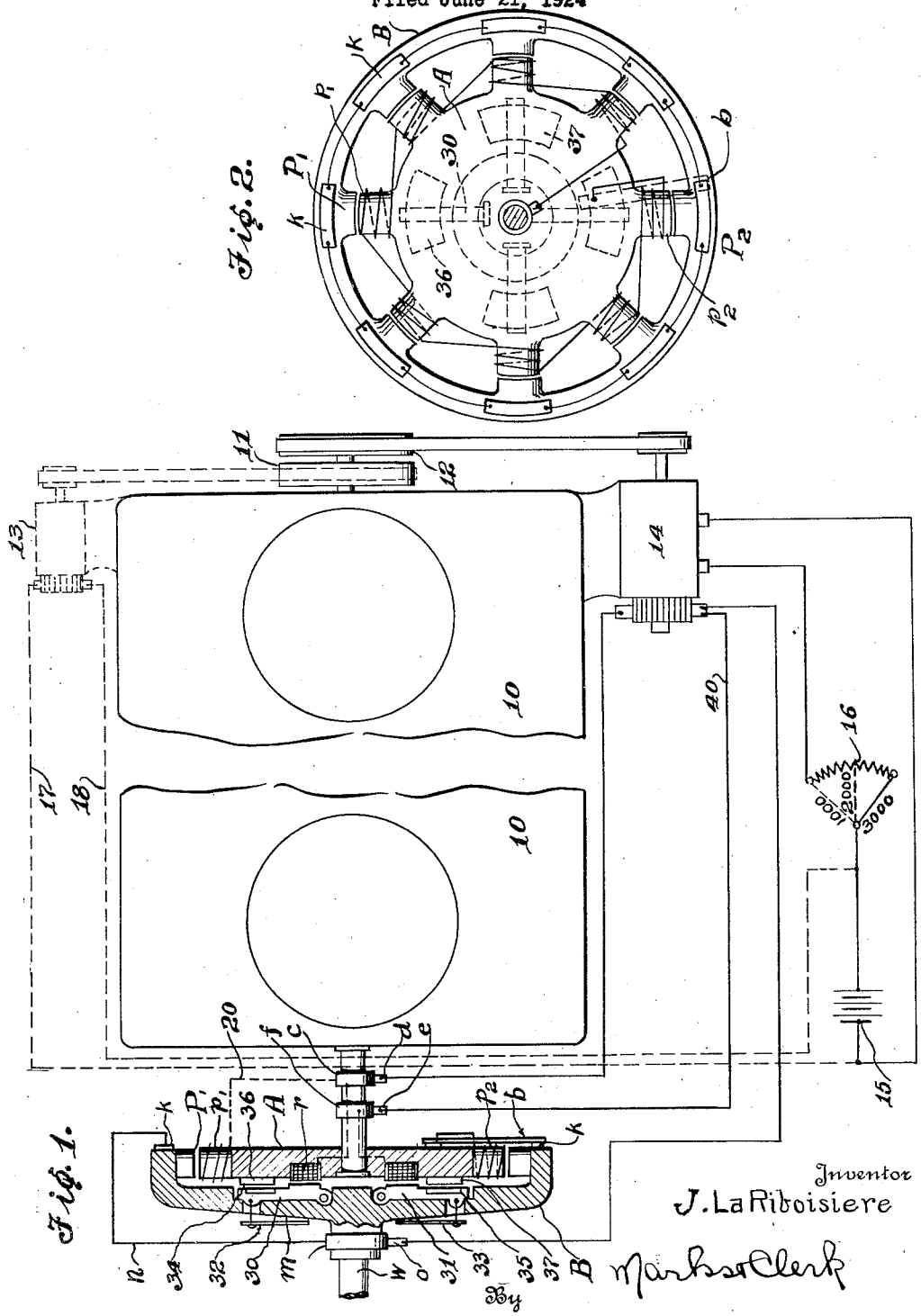
Inventor
J. La Riboisiere
By Marks & Clerk
Attorneys Patented July 28, 1925.

1,548,016

UNITED STATES PATENT OFFICE.

JEAN LA RIBOISIERE, OF WASHINGTON, DISTRICT OF COLUMBIA.

COMBINED CLUTCH AND TRANSMISSION MECHANISM.

Application filed June 21, 1924. Serial No. 721,573.

*To all whom it may concern:*

Be it known that I, JEAN LA RIBOISIERE, a citizen of the French Republic, and residing at Washington, District of Columbia, have invented certain new and useful Improvements in Combined Clutch and Transmission Mechanism, of which the following is a specification.

This invention relates in general to coupling devices for machines and more particularly to a combined clutch and transmission mechanism for motor cars, and its object is to replace the ordinary comparatively complicated gear boxes by a simpler device. This is accomplished by using a number of magnetic poles whose magnetism is variable in accordance with the speed to be transmitted, these poles being moved past other magnetic poles combined with the part to be driven. The magnetizing current is preferably only switched on at certain moments during the movement of the driving magnetic poles past the driven poles. A variable resistance is preferably connected in the exciting circuit. The magnetic poles may be excited by current from a dynamo provided for this purpose whose field magnets are only slightly saturated so that the energizing current delivered by the dynamo to the poles of the coupling device increases in direct proportion to the speed of the motor or engine that drives the dynamo. The strength of the field of said dynamo may be changed by a field regulating resistance. The arrangement is such that at a certain speed or speeds of the engine there will be no slip in the magnetic coupling device. The slip is prevented from occurring at these speeds by a device consisting of movable members which, as soon as the engine is speeded up to a certain point, are moved by an electro-magnet so as to rigidly connect the driving part with the driven part of the coupling device.

The invention is illustrated by way of example in the drawing in which:

Figure 1 is a diametrical section of the coupling device and a diagrammatic plan view of the driving engine with the lighting dynamo and the dynamo for supplying the current for the coupling device intended to replace the gear box of a motor car.

Fig. 2 is a diagrammatic side view of the coupling device.

Referring to the drawing 10 denotes the internal combustion engine which is assumed to be a four-cylinder engine and drives, by means of belt pulleys or sprocket wheels 11 and 12, a lighting dynamo 13 and a dynamo 14 which supplies current to the electromagnetic coupling device. The dynamo 14 is arranged for separate excitation by a battery 15 and a regulating resistance 16 is interposed in the excitation circuit. The battery 15 is connected by wires 17 and 18 to the lighting dynamo for charging purposes. The coupling device consists of a rotor A, driven by the engine 10 and of a rotary part B whose shaft is connected to the propeller shaft or part of the motor car to be driven. The rotor A consists of a ring of electro-magnet poles $p^1$, $p^2$ and it also carries an annular magnet $r$. Current is supplied by the dynamo 14 through a wire 19, a brush $d$, slip ring $c$, wire 20, to the coils of the poles $p^1$, $p^2$. After passing through the coils of all the poles the current flows to a brush $b$ which wipes over contact segments $k$ and thence through a wire $n$, slip ring $m$, brush $o$, back to the dynamo 14. It is thus seen that the energizing circuit of the poles $p^1$, $p^2$ is only closed at the moments in which the brush $b$ wipes over the segments $k$ and this happens whenever the poles $p^1$, $p^2$ are opposite to the poles $P^1$, $P^2$ and have not advanced past them beyond a certain angle. When they have advanced beyond this angle the brush $b$ leaves the particular contact segment $k$ and the current is then interrupted until the brush reaches the next segment $k$.

When the annular magnet $r$ is sufficiently energized by way of wires 19 and 40, the coupling arms 30, 31, which are usually held in the position shown by springs 32, 33, are pulled towards the right so that their braking or coupling cheeks 34, 35 are pulled against the coupling cheeks 36, 37. The coupling cheeks 36, 37 may be shaped so that when the cheeks 34, 35 are attracted their ends strike against projections on the cheeks 36, 37 and all motion of the rotors A and B with respect to each other is thus prevented. This result can also be obtained by providing the contacting surfaces of the cheeks 34, 36 and 35, 37 with material that has a high friction co-efficient such as ferrodo.

The illustrated device operates in the following manner: When the admission of gas to the engine is adjusted so that the latter runs at a comparatively low speed, say 1000 revolutions per minute, the regulating resistance 16 is cut out of the field circuit by moving its lever into the position marked 1000. During the time in which the motor has not speeded up to 1000 revolutions per minute the dynamo 14 will generate a tension at which the annular magnet $r$ does not move the coupling members 30, 31 from their normal position in which they are held by the springs 31, 32. Hence, until the engine 10 is speeded up to 1000 revolutions the magnet poles $p^1$, $p^2$ only will act on the rotary member B. Whenever the poles $p^1$, $p^2$ move past the counter poles $P^1$, $P^2$ a torque is exerted on the rotary member B. The slip between the poles $p$ and $P$ diminishes as the tension generated by the dynamo 14 rises until finally the annular magnet $r$ receives sufficient current through the wires 19 and 40, brushes $d$ and $e$ and slip rings $c$ and $f$ to cause the coupling members 30 and 31 to be attracted so as to rigidly couple the rotary members A and B to each other. If the admission of gas to the motor is now increased to enable it to reach a speed of 2000 revolutions per minute the lever of the field resistance 16 is also moved to another position marked 2000. The annular magnet $r$ then releases the coupling members 30 and 31 and the coupling between the rotary members A and B is again effected through the poles $p$ and P. The slip between the poles $p$ and P now gradually decreases as the tension of the dynamo 14 rises with the speed of the motor 10. When this tension reaches a certain value the annular magnet $r$ again operates to effect a rigid coupling between the rotors A and B by means of the movable members 30 and 31. If it is desired to make the engine 10 give a still larger output as by increasing its speed up to 3000 revolutions the hole of the field regulating resistance 16 is cut in by moving the lever into the position marked 3000. The annular magnet now again releases the coupling members 30, 31 and the rotors A and B are then again only coupled to each other by the poles P and $p$, the poles $p$ rotating at a greater speed than the poles P. When the speed of the engine reaches 3000 revolutions per minute the dynamo 14 again generates sufficient tension to cause the annular magnet $r$ to attract the coupling members 30, 31 and effect a rigid coupling between the rotors A and B.

To obtain a satisfactory co-operation between the dynamo 14 and the annular magnet $r$ the magnet poles of the dynamo are only slightly saturated at the outset so that the energizing current supplied by the dynamo to the electro-magnetic coupling grows approximately in direct proportion to the speed of the internal combustion engine 10.

What I claim and desire to secure by Letters-Patent is:

1. In combination, a prime mover, a driving shaft actuated by said prime mover, a driven shaft, a dynamo actuated by the prime mover and having a variable resistance in its field winding, a source of current, means actuated by the prime mover for charging said source of current, and coupling means for said shafts energized by the dynamo for driving the driven shaft from the driving shaft by electro-magnetic force.

2. In combination, a prime mover, a driving shaft actuated by said prime mover, a driven shaft, a dynamo actuated by the prime mover and having a variable resistance in its field winding, a battery connected to the field winding of the dynamo, a generator driven by the prime mover and arranged to charge said battery, and coupling means for said shafts including elements energized by said dynamo for causing the driven shaft to be driven from the driving shaft by electro-magnetic force.

3. In combination, a prime mover, a driving shaft actuated by said prime mover, a rotor rotatable with the driving shaft and provided with spaced cores, a driven shaft, a driven rotary member movable with the driven shaft and having cores arranged in close proximity to the cores of the first mentioned rotary member, coils associated with the cores of one of said members for attracting the cores of the other member, a dynamo for energizing said coils, a variable resistance arranged in the field winding of said dynamo, a source of current connected to the field winding of the dynamo, and means actuated by the prime mover for charging said source of current.

4. In combination, a prime mover, a driving member actuated by said prime mover and provided with cores, a driven member having cores to cooperate with the other cores for coupling said members together, coils provided upon the cores of one of said members, a dynamo actuated by the prime mover and operatively connected to the coils for energizing the latter, a variable resistance in the field winding of the dynamo, a source of current connected to the field winding of the dynamo, and means actuated by the prime mover for charging said source of current.

5. In combination, a prime mover, a driving member actuated by the prime mover, a driven member actuated by the driving member, electric elements cooperating with said members for coupling the same together, a dynamo actuated by said prime mover and operatively connected to said elements for energizing the latter, a variable resistance arranged in the field winding of the dynamo, a source of current connected to the field winding of the dynamo, and means actuated by the prime mover for charging said source of current.

6. In combination, a prime mover, a driving member actuated by the prime mover, a driven member actuated by the driving member, a dynamo actuated by the prime mover and having a variable resistance in its field winding, coupling means for said members including electric elements energized by the dynamo for driving the driven member from the driving member by electro-magnetic force, a positive clutch associated with said members and actuated by the dynamo for rigidly connecting said members together, a source of current connected to the field winding of the dynamo, and means actuated by the prime mover for charging said source of current.

7. In combination, a prime mover, a driving member and a driven member associated with said prime mover, one of said members being provided with radially spaced cores and an annular magnet, an arm mounted on the same member, the other member having cores cooperating with the first mentioned cores and also having contacts in alignment with its cores, said last mentioned member also having clutch elements resiliently held in inoperative position and arranged opposite said magnet, coils arranged on the cores of one of said members, a dynamo actuated by the prime mover and operatively connected to said coils, magnet and arm for energizing the same, said dynamo being also operatively connected to said contacts to permit the arm to make and break the circuit as the arm makes and breaks connection with said contacts, and a variable resistance in the field winding of said dynamo.

8. In combination, a prime mover, a driving member actuated by the prime mover, a driven member actuated by the driving member, coupling means for coupling said members together by electro-magnetic force, a dynamo actuated by the prime mover and operatively connected to the coupling means for energizing the latter, a variable resistance in the field winding of the dynamo, a source of current connected to said field winding, and a generator actuated by the prime mover and operatively connected to the source of current for charging the latter.

9. In combination, a prime mover, a driving member actuated by the prime mover, a driven member actuated by the driving member, a dynamo actuated by the prime mover, a series of magnet poles operatively connected to the dynamo, the magnetism of which is variable in accordance with the speed of the dynamo, second poles arranged on the other member and cooperating with the first mentioned poles for actuating the driven member from the driving member, the magnet poles of the dynamo being only slightly saturated so that the excitation of the poles of said members increases substantially in proportion to the speed of the dynamo, a source of current connected to the field winding of the dynamo and means actuated by the prime mover for charging said source of current.

10. In combination, a prime mover, a driving member actuated by the prime mover, a driven member actuated by the driving member, a dynamo actuated by the prime mover, a series of magnet poles operatively connected to the dynamo, the magnetism of which is variable in accordance with the speed of the dynamo, second poles arranged on the other member and cooperating with the first mentioned poles for actuating the driven member from the driving member, the magnet poles of the dynamo being only slightly saturated so that the excitation of the poles of said members increases substantially in proportion to the speed of the dynamo, switching means for switching on the current to the poles of the members only while the poles of one member are moving past the poles of the other member, and for immediately switching off the current during the passage of one member between the poles of the other member.

11. In combination, a prime mover, a driving member actuated by the prime mover, a driven member actuated by the driving member, a dynamo actuated by the prime mover, a series of magnet poles operatively connected to the dynamo, the magnetism of which is variable in accordance with the speed of the dynamo, second poles arranged on the other member and cooperating with the first mentioned poles for actuating the driven member from the driving member, the magnet poles of the dynamo being only slightly saturated so that the excitation of the poles of said members increases substantially in proportion to the speed of the dynamo, and means controlled by the dynamo for positively clutching said members together at predetermined speeds of the dynamo.

12. In combination, a prime mover, a driving member actuated by the prime mover, a driven member actuated by the driving member, a dynamo actuated by the prime mover, a series of magnet poles operatively connected to the dynamo, the magnetism of which is variable in accordance with the speed of the dynamo, second poles arranged on the other member and cooperating with the first mentioned poles for actuating the driven member from the driving member, the magnet poles of the dynamo being only slightly saturated so that the excitation of the poles of said members increases substantially in proportion to the speed of the dynamo, and means for positively clutching said members together and including pivotally mounted elements normally retained in inoperative position by resilient means, said dynamo functioning to actuate the pivoting members and to move the same into operative position.

In testimony whereof I hereunto affix my signature.

JEAN LA RIBOISIERE.